(12) United States Patent
Dharssi

(10) Patent No.: US 9,712,852 B2
(45) Date of Patent: Jul. 18, 2017

(54) SYSTEM AND METHOD FOR ALTERING IMAGES IN A DIGITAL VIDEO

(76) Inventor: Fatehali T. Dharssi, Vancouver (CA)

( * ) Notice: Subject to any disclaimer, the term of this patent is extended or adjusted under 35 U.S.C. 154(b) by 573 days.

(21) Appl. No.: 12/684,758

(22) Filed: Jan. 8, 2010

(65) Prior Publication Data

US 2011/0170772 A1    Jul. 14, 2011

(51) Int. Cl.
| | |
|---|---|
| G06K 9/00 | (2006.01) |
| H04N 21/234 | (2011.01) |
| G06Q 30/02 | (2012.01) |
| H04N 21/2343 | (2011.01) |

(52) U.S. Cl.
CPC ... *H04N 21/23418* (2013.01); *G06Q 30/0276* (2013.01); *H04N 21/234318* (2013.01)

(58) Field of Classification Search
None
See application file for complete search history.

(56) References Cited

U.S. PATENT DOCUMENTS

| | | | | |
|---|---|---|---|---|
| 6,724,915 | B1 * | 4/2004 | Toklu | G06T 7/248 |
| | | | | 382/103 |
| 6,924,832 | B1 * | 8/2005 | Shiffer | G06T 7/248 |
| | | | | 348/36 |
| 6,944,331 | B2 | 9/2005 | Schmidt et al. | |
| 7,227,893 | B1 * | 6/2007 | Srinivasa | G06K 9/00771 |
| | | | | 348/155 |
| 7,334,249 | B1 * | 2/2008 | Byers | H04N 7/165 |
| | | | | 348/E7.063 |
| 2001/0026616 | A1 * | 10/2001 | Tanaka | G06T 1/0028 |
| | | | | 380/202 |
| 2002/0004819 | A1 * | 1/2002 | Agassy | G06F 17/30008 |
| | | | | 709/203 |
| 2002/0090110 | A1 * | 7/2002 | Braudaway | G06T 1/005 |
| | | | | 382/100 |
| 2003/0028432 | A1 | 2/2003 | Troyansky et al. | |
| 2003/0028873 | A1 | 2/2003 | Lemmons | |
| 2003/0149975 | A1 | 8/2003 | Eldering et al. | |
| 2005/0025357 | A1 * | 2/2005 | Landwehr | A01M 1/026 |
| | | | | 382/170 |
| 2005/0137958 | A1 | 6/2005 | Huber et al. | |

(Continued)

FOREIGN PATENT DOCUMENTS

EP        1150505 A1 * 10/2001

OTHER PUBLICATIONS

Duda et al., "Use of the Hough Transformation to Detect Lines and Curves in Pictures," *Graphics and Image Processing*, W. Newman, editor, pp. 11-15, 1972.

(Continued)

*Primary Examiner* — Tsung-Yin Tsai (57) ABSTRACT

A method of altering a distinctive image within a digital video file is provided, wherein data representing a set of images in the file is selected. The data is then scanned for a pixel having a color associated with the distinctive image. Then additional pixels having the color are located in a plurality of directions relative to the first pixel. A shape is determined based on the location of pixels, and the shape compared to the distinctive image so that a probability can be determined as to whether the shape represents the distinctive image. If the probability exceeds a confidence level, then the distinctive image is altered.

14 Claims, 6 Drawing Sheets

(56) References Cited

U.S. PATENT DOCUMENTS

| | | | |
|---|---|---|---|
| 2005/0140788 A1* | 6/2005 | Fox | H04N 1/32101 348/207.1 |
| 2005/0172312 A1* | 8/2005 | Lienhart | G06F 17/30802 725/19 |
| 2005/0251820 A1 | 11/2005 | Stefanik et al. | |
| 2006/0195859 A1* | 8/2006 | Konig | G06F 17/30802 725/19 |
| 2006/0195860 A1* | 8/2006 | Eldering | G06F 17/30802 725/19 |
| 2006/0271947 A1* | 11/2006 | Lienhart | G06F 17/30787 725/19 |
| 2008/0019560 A1* | 1/2008 | Rhoads | G06K 7/1417 382/100 |
| 2008/0063279 A1* | 3/2008 | Vincent | G06K 9/00463 382/182 |
| 2008/0130948 A1* | 6/2008 | Ozer | G06K 9/00228 382/103 |
| 2008/0301224 A1 | 12/2008 | Papageorgiou | |
| 2009/0238460 A1 | 9/2009 | Funayama et al. | |
| 2009/0278937 A1 | 11/2009 | Botchen et al. | |
| 2009/0300480 A1 | 12/2009 | Cohen et al. | |
| 2010/0290667 A1* | 11/2010 | Lienhart | G06F 17/30802 382/100 |
| 2011/0170772 A1 | 7/2011 | Dharssi | |
| 2011/0267538 A1 | 11/2011 | Dharssi | |
| 2013/0243394 A1 | 9/2013 | Dharssi | |

OTHER PUBLICATIONS

Friedman, W., "Virtual Placement Gets Second Chance," URL=http://adage.com/print/101981, Feb. 14, 2005, 2 pages.
Johannes, A., "TV Placements Overtake Film," URL=http://www.chiefmarketer.com/special-reports-chief-marketer/tv-placements-overtake-film . . . , May 1, 2005, 3 pages.
Lowe, D., "Object Recognition from Local Scale-Invariant Features," *Proc. of the International Conference on Computer Vision,* Corfu, Sep. 1999, 8 pages.
Viola, P., "Robust Real-Time Object Detection," Compaq, Cambridge Research Laboratory, Technical Report Series, CRL Jan. 2001, Feb. 2001, 30 pages.
"5.5 Conversion to Grayscale," URL=http://gimp-savvy.com/BOOK/node54.html, retrieved Mar. 13, 2014, 4 pages.
Dharssi, "System and Method for Altering Images in a Video File Using Predetermined Parameters," Office Action mailed Jul. 2, 2012, for U.S. Appl. No. 12/770,101, 12 pages.
International Search Report, mailed Sep. 18, 2012, for PCT/CA2012/000558, 4 pages.
Written Opinion, mailed Sep. 18, 2012, for PCT/CA2012/000558, 7 pages.

* cited by examiner

SYSTEM AND METHOD FOR ALTERING IMAGES IN A DIGITAL VIDEO

FIELD OF THE INVENTION

This invention relates to digital video, such as that available via the Internet, and more particularly to altering and substituting images in such digitized videos.

BACKGROUND

Advertising in video, such as a television (TV) program, is primarily accomplished by either placing a conventional advertisement in commercial breaks during the display of the TV program (which is an explicit means of advertising) or, by placing a product in the scenes of the video in which the product appears as "naturally" part of the scene, and is not being explicitly advertised (this form of advertising is known as "implicit advertising"). As advertising becomes more cluttered on TV and on the Internet, and with the increasing ability of video viewers (i.e. intended consumers of the advertisers) to avoid such advertising using digital video recorders (DVRs) and other means, the demand for implicit advertising continues to grow.

The market for implicit advertising has been valued at over $4 billion in 2005, and has been growing at over 20% per year. Today, product placements appear in TV shows, films, video games, and new media such as the online virtual world known as Second Life.

Typically, products placed in videos as implicit advertising are placed when the video is filmed or made. Another method adds a flash movie layer to a streaming video format to provide interactivity to the video, thereby allowing users to scroll over or click on elements within the video to obtain more information. Once the video is released for viewing, there lacks a means to identify, locate, replace, supplement or otherwise alter the original product placed in the streaming video.

SUMMARY OF THE INVENTION

A method of altering a distinctive image within a digital video file is provided, including: a) selecting data representing a set of images within the digital video file; b) scanning the data for an indication of a color associated with the distinctive image; c) searching for additional indications of the color in a plurality of directions relative to the first pixel; d) determining a shape associated with the additional data indicating the color; e) determining if a plurality of data in a relative position to the shape indicate a color conforming to the distinctive image; f) calculating a probability that the image is present in the selected data; and g) if the probability exceeds a confidence level, altering the distinctive image; and h) repeating steps a) through g) on following data representing subsequent frames until the calculated probability does not exceed the confidence level.

A system for altering an image of a product within a digital video file is provided, including: a) a first computer requesting the digital video file from a second computer over a network; b) at least one of the first or second computers configured to: i) select data representing a frame within the digital video file; ii) scan the data for a first pixel having a color associated with an image; iii) search for additional pixels having the color in a plurality of directions relative to the first pixel; iv) determine a shape associated with the additional pixels of the color; v) determine if a plurality of pixels in a relative position to the shape have a color conforming to the image; vi) calculate a probability that the image is present in the data; and vii) if the probability exceeds a confidence level, alter the image; viii) repeat steps a) through g) on data representing following frames until the calculated probability does not exceed the confidence level.

A method of altering a distinctive image is provided, including: a) receiving a digital video file playable at a computer; b) locating a distinctive image within the digital video file; c) altering said distinctive image to an image having a greater value.

A method of determining a context of a distinctive image within data of a digital video file is provided, including: a) locating the first distinctive image within the digital video file; b) locating a second distinctive image within the digital video file; c) using said first and second distinctive images to determine a context of the frame.

DETAILED DESCRIPTION OF THE INVENTION

The system and method according to the invention provide a means whereby distinctive images, such as trade-marks i.e. brand names and/or logos, or Universal Product Codes (UPC), can be identified and located within a digital video file, and replaced, supplemented, added to or otherwise altered from what appeared in the original digital video file. A "digital video file", also referred to herein as "video file", is defined in this document as data which can be processed by a computer to produce one or more color pictures or images, motion video, or moving pictures. A digital video file may be copied to a computer before being viewed, or may be viewed as a computer is downloading the digital video file, as in the case of streaming video.

As used in this document a "distinctive image" means a recognizable image within a streaming video. Distinctive images include trade-marks, addresses, and even the entire shapes of certain objects, such as road signs, cellular phones, product images, cereal boxes and room design, layout and decor.

The following discussion provides a brief and general description of a suitable computing environment in which various embodiments of the system may be implemented. Although not required, embodiments will be described in the general context of computer-executable instructions, such as program applications, modules, objects or macros being executed by a computer. Those skilled in the relevant art will appreciate that the invention can be practiced with other computing system configurations, including hand-held devices, multiprocessor systems, microprocessor-based or programmable consumer electronics, personal computers ("PCs"), network PCs, mini-computers, mainframe computers, mobile phones, personal digital assistants, personal music players (like IPOD's) and the like. The embodiments can be practiced in distributed computing environments where tasks or modules are performed by remote processing devices, which are linked through a communications network. In a distributed computing environment, program modules may be located in both local and remote memory storage devices.

As used herein, the terms "computer" and "server" are both computing systems as described in the following. A computing system may be used as a server including one or more processing units, system memories, and system buses that couple various system components including system memory to a processing unit. Computing system will at times be referred to in the singular herein, but this is not intended to limit the application to a single computing system since in typical embodiments, there will be more than one computing system or other device involved. Other computing systems may be employed, such as conventional and personal computers, where the size or scale of the system allows. The processing unit may be any logic processing unit, such as one or more central processing units ("CPUs"), digital signal processors ("DSPs"), application-specific integrated circuits ("ASICs"), etc. Unless described otherwise, the construction and operation of the various components are of conventional design. As a result, such components need not be described in further detail herein, as they will be understood by those skilled in the relevant art.

The computing system includes a system bus that can employ any known bus structures or architectures, including a memory bus with memory controller, a peripheral bus, and a local bus. The system also will have a memory which may include read-only memory ("ROM") and random access memory ("RAM"). A basic input/output system ("BIOS"), which can form part of the ROM, contains basic routines that help transfer information between elements within the computing system, such as during startup.

The computing system also includes non-volatile memory. The non-volatile memory may take a variety of forms, for example a hard disk drive for reading from and writing to a hard disk, and an optical disk drive and a magnetic disk drive for reading from and writing to removable optical disks and magnetic disks, respectively. The optical disk can be a CD-ROM, while the magnetic disk can be a magnetic floppy disk or diskette. The hard disk drive, optical disk drive and magnetic disk drive communicate with the processing unit via the system bus. The hard disk drive, optical disk drive and magnetic disk drive may include appropriate interfaces or controllers coupled between such drives and the system bus, as is known by those skilled in the relevant art. The drives, and their associated computer-readable media, provide non-volatile storage of computer readable instructions, data structures, program modules and other data for the computing system. Although computing systems may employ hard disks, optical disks and/or magnetic disks, those skilled in the relevant art will appreciate that other types of non-volatile computer-readable media that can store data accessible by a computer may be employed, such a magnetic cassettes, flash memory cards, digital video disks ("DVD"), Bernoulli cartridges, RAMs, ROMs, smart cards, etc.

Various program modules or application programs and/or data can be stored in the system memory. For example, the system memory may store an operating system, end user application interfaces, server applications, and one or more application program interfaces ("APIs").

The system memory also includes one or more networking applications, for example a Web server application and/or Web client or browser application for permitting the computing system to exchange data with sources, such as clients operated by users and members via the Internet, corporate Intranets, or other networks as described below, as well as with other server applications on servers such as those further discussed below. The networking application in the preferred embodiment is markup language based, such as hypertext markup language ("HTML"), extensible markup language ("XML") or wireless markup language ("WML"), and operates with markup languages that use syntactically delimited characters added to the data of a document to represent the structure of the document. A number of Web server applications and Web client or browser applications are commercially available, such those available from Mozilla and Microsoft.

The operating system and various applications/modules and/or data can be stored on the hard disk of the hard disk drive, the optical disk of the optical disk drive and/or the magnetic disk of the magnetic disk drive.

A computing system can operate in a networked environment using logical connections to one or more client computing systems and/or one or more database systems, such as one or more remote computers or networks. The computing system may be logically connected to one or more client computing systems and/or database systems under any known method of permitting computers to communicate, for example through a network such as a local area network ("LAN") and/or a wide area network ("WAN") including, for example, the Internet. Such networking environments are well known including wired and wireless enterprise-wide computer networks, intranets, extranets, and the Internet. Other embodiments include other types of communication networks such as telecommunications networks, cellular networks, paging networks, and other mobile networks. The information sent or received via the communications channel may, or may not be encrypted. When used in a LAN networking environment, the computing system is connected to the LAN through an adapter or network interface card (communicatively linked to the system bus). When used in a WAN networking environment, the computing system may include an interface and modem (not shown) or other device, such as a network interface card, for establishing communications over the WAN/Internet.

In a networked environment, program modules, application programs, or data, or portions thereof, can be stored in the computing system for provision to the networked computers. In one embodiment, the computing system is communicatively linked through a network with TCP/IP middle layer network protocols; however, other similar network protocol layers are used in other embodiments, such as user datagram protocol ("UDP"). Those skilled in the relevant art will readily recognize that these network connections are only some examples of establishing communications links between computers, and other links may be used, including wireless links.

While in most instances the computing system will operate automatically, where an end user application interface is provided, an operator can enter commands and information into the computing system through an end user application interface including input devices, such as a keyboard, and a pointing device, such as a mouse. Other input devices can include a microphone, joystick, scanner, etc. These and other input devices are connected to the processing unit through the end user application interface, such as a serial port interface that couples to the system bus, although other interfaces, such as a parallel port, a game port, or a wireless interface, or a universal serial bus ("USB") can be used. A monitor or other display device is coupled to the bus via a video interface, such as a video adapter (not shown). The computing system can include other output devices, such as speakers, printers, etc.

Figure 1:
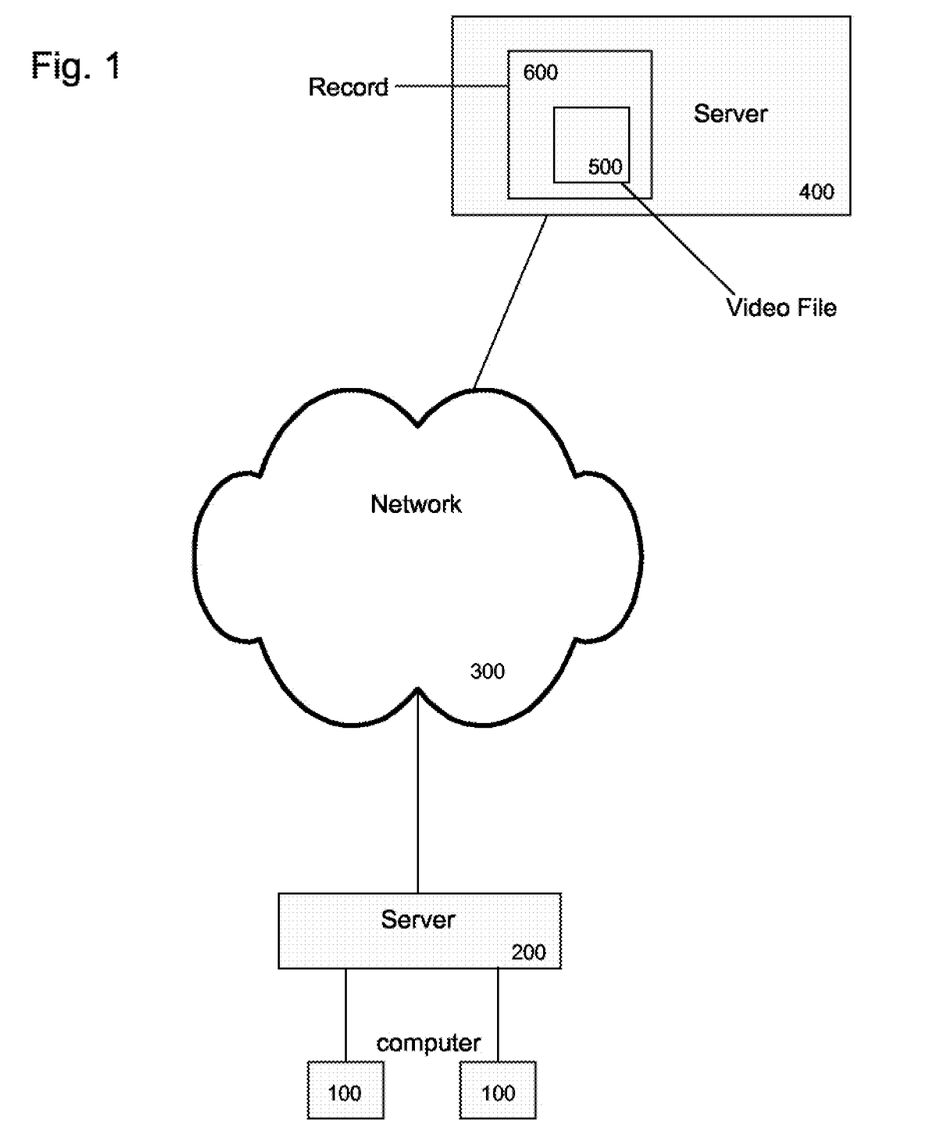
FIG. 1 is a block diagram showing a system wherein the invention may be practiced.

As seen in FIG. 1, a typical embodiment of a system according to the invention is shown. A user operates a computer 100 capable of playing digital video, such as streaming video. Computer 100 is a computing system as described above, and has a network link and software and/or hardware to play and display videos from one or more servers 400 accessible via network 300. Computer 100 is typically connected to network via server 200. Server 200 may be operated by an Internet Service Provider (ISP). Server 200 communicates and exchanges files with other servers 400 in communication with network 300. Network 300 may be the Internet, but may also be a LAN, or WAN.

When a digital video file 500, which may be streaming video, is requested by computer 100, server 200 requests the file 500 from server 400, and server 400 responds by providing file 500 to server 200, and thereby to computer 100. File 500 thus passes through several computers or servers, including several that may be in network 300, each of which has the opportunity to alter video file 500 according to its instructions. For example, computer 100 may alter video file 500 by substituting a distinctive image, for example a trade-marked good such as a trade-marked can, with another. This substitution may be at the request of the owner of both trade-marks, for example in the case where the original trade-mark is not available in the geographic region of the user, and therefore advertising efforts using the original trade-mark will likely be wasted.

Video file 500 is typically in server 400's memory as part of record 600 within a database. Record 600 may contain a variety of data about video file 500, and may also contain information about users as described below.

There are several other locations where the substitution may be made. For example, a trunk line along which the files are transmitted; or on server 400, for example if server 400 hosts a website displaying videos, such as YOUTUBE, whereat the public can post and view videos. The method allows providers of such websites to digitally and electronically insert product or brand images into videos before these are viewed by the public and to sell this service as product placement advertising. The substitution could also be conducted on a server 400 of a search engine, such as GOOGLE, where the method could be used to identify a brand image on any electronic picture or video communication and changed as required. Alternatively ISP server 200 could alter video file 500, for example based on the geographic location of computer 100.

Figure 2:
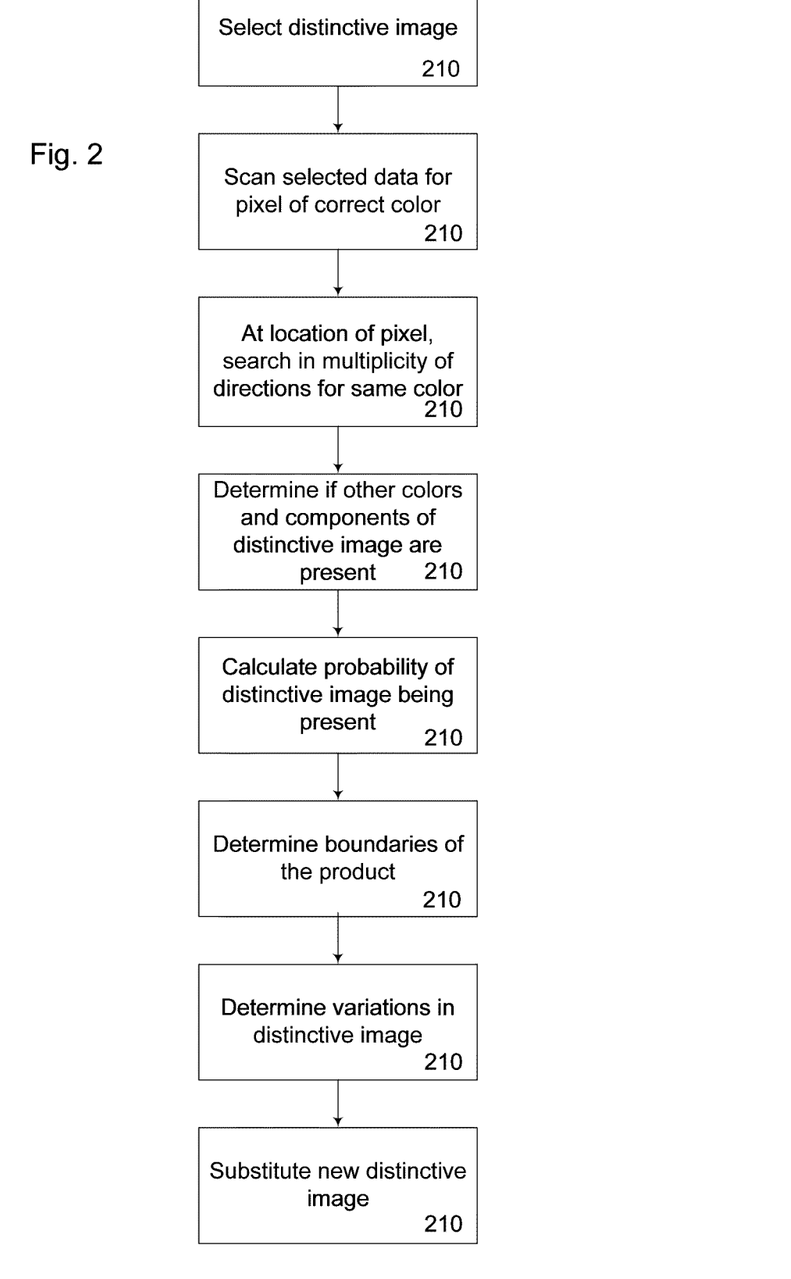
FIG. 2 is a flow chart showing the method by which images are altered according to the invention.

The method, as seen in FIG. 2, begins with selection of a distinctive image, such as a trade-mark (step 210). Distinctive images, such as trade-marks, as used on products, for example cans, bottles or boxes, typically have a unique color and shape. For example many trade-marks use a particular combination of shapes and colors, as well as characters, such as text, numbers or symbols, on such products. As an example, a CREST logo appears with a particular combination of colors and shapes on a box of toothpaste. The method according to the invention uses these unique patterns to identify distinctive images on products that may be appropriate for alteration, such as substitution. Note in some cases, video file 500 may be flagged as containing a particular trade-mark or product, in which case the system need only locate the trade-mark in the video frames, rather than determine if such a trade-mark is present. Such flagging could provide either detailed information about distinctive images within a video file, such as that a certain trade-mark appears between certain times, and the position or size of the image, or provide other information, such that the video is set in a certain location, such as a kitchen or bathroom, or a certain geographical location, such as a particular city.

The distinctive images appear as images within data that is part of the digital video file. This data provides information about a plurality of pixels within the digital video, each pixel having certain characteristics such as a location within an image, color, brightness, etc.

Figure 3:
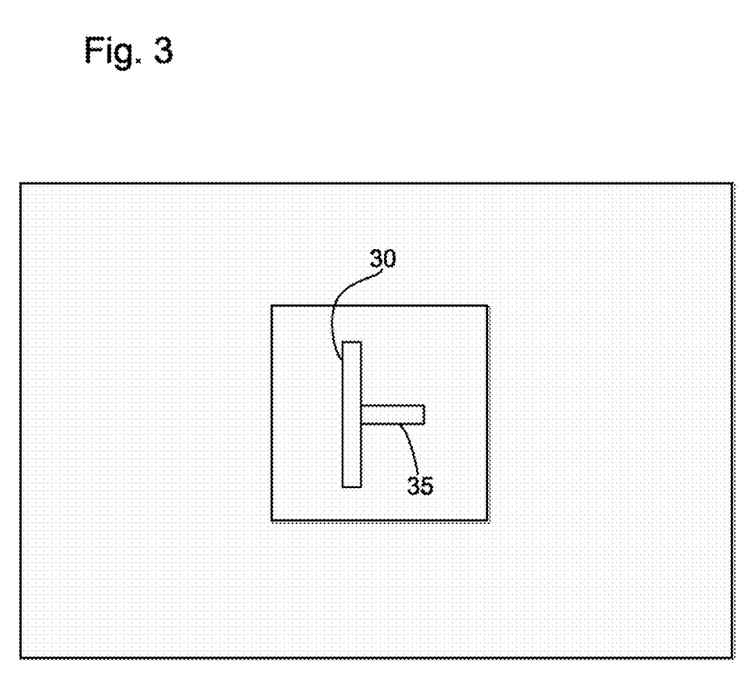
FIG. 3 is a view of an original frame that is part of a streaming video, including a box showing a trade-mark.

Prior to attempting to recognize digital video data of a streaming video that include such a trade-mark, it is important that the unique combinations of these colors and shapes be known. For example, the relationship of the colors as portrayed in the letters can be expressed mathematically. Given the size of the image may not be known prior to the search for the trade-mark, it is important the mathematical relationships between components of the mark be known. For example in a particular fictional trade-mark used as an example herein, as seen in FIG. 3, a yellow bar 30 may always be intercepted by a perpendicular red bar 35 at the midpoint of the yellow bar that extends to a distance half the length of the yellow bar. This relationship between yellow bar 30 and red bar 35 remains relatively constant, subject to fluctuations based on the positioning of the product bearing the trade-mark.

Digital video file 500, depending on the compression used, may be based on a successive series of images, known as frames, or are more likely based on changes from a particular frame, i.e. from a beginning image, changes in color of particular pixels are timed. As used herein a "frame" of a digital video is a collection of data, such as pixels, that represent a fixed image of the digital video at a particular time.

Data representing a set of images within a digital video is divided into a series of pixels, each having a location on the screen and a color code. The pixels are defined by color, position and time. Using the above example to locate the trade-mark, the system first scans a selection of such data in the digital video, such as streaming video, for pixels of a particular color (step 215). The system may scan every xth pixel of every nth frame, wherein a series of consecutive frames with a value less than n would not be distinguishable by a viewer. The nth frame may be selected on a basis of time (every ¼ second, for example), so the video would be sampled with images every n seconds. In such a case, the video file may be analyzed simultaneously, rather than frame by frame sequentially. For the purposes of an example, the frame being scanned is shown in FIG. 3. The system may check simultaneously for a number of colors, for either the purpose of locating more than on distinctive images, or to cover a range of colors to factor for shading and other color variations of the trade-mark.

Figure 5A:
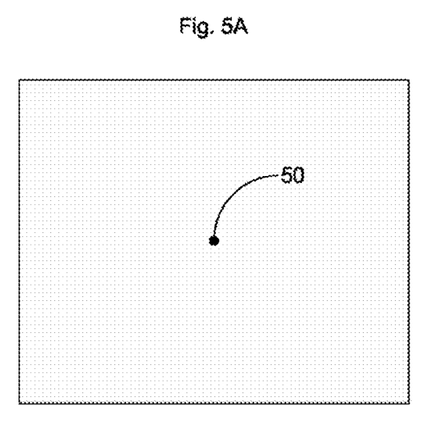
FIGS. 5A through 5D are views of data representing a frame in which a trade-mark is being searched for according to the invention.
Figure 5B:
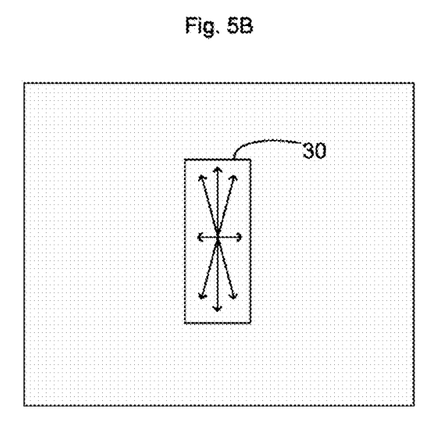

If a pixel 50 with the appropriate color is located by sampling within the data set, as shown in FIG. 5A, the pixel having the color within a certain range of values (for example to account for differences in shading and lighting), a search is conducted in several directions, as show in FIG. 5B, for example 0%, 90%, 180% and 270%, from that pixel to determine the boundaries of the color (step 220) by determining when the color changes. This allows the system to determine the shape pixels of that color form. Using the above example trade-mark of a yellow bar 30 intercepted by the perpendicular red bar 35, the system determines the shape is a yellow bar 30, having the appropriate height and width ratio to be part of the desired trade-mark.

Figure 5C:
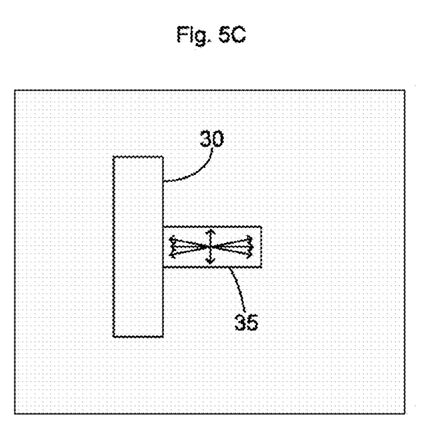
Figure 5D:
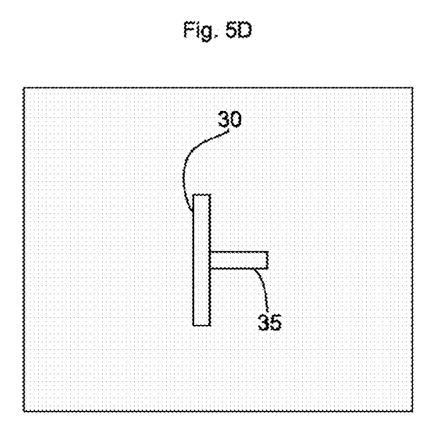

The system then determines if the trade-mark is present by checking for other colors and components (step 225) of the trade-mark. Using the example above, once the yellow bar has been located, the system then determines if a perpendicular red bar meets the yellow bar at its midpoint. This is accomplished by determining the midpoint, and checking for pixels with the appropriate red color, as seen in FIG. 5C. After the color patterns of the distinctive image have been determined, a probability that a particular distinctive image is present is calculated (step 228). If this probability exceeds a predetermined confidence level, the system acts as though that distinctive image is present in the frame.

These relationships are used for determining the presence of a particular distinctive image. Text, for example, will typically be of a similar size and color, and have certain relationships (e.g. a "T" includes a perpendicular line bisecting a horizontal line from below). All distinctive images, be they products, trade-marks, text, etc. can be represented by such relationships. Likewise, the relationships can be varied depending on the positioning of the distinctive image in the frame (for example the "T" could be positioned upside-down).

Once the various components of the distinctive image have been located, the size of the distinctive image can be determined.

The next step is to determine the context of the distinctive image, including the boundaries of the product the distinctive image is part of, for example a tube, a can, a bottle, a box, or a poster (step 230). Again, this is accomplished by again checking in various directions from the position of the trademark for borders, fluctuations in color, etc.

The system also determines the surroundings of the product, also known as part of the "context" of the image, for example if it is held by an actor, or is on a kitchen counter. Knowledge of the product's typical surroundings can be incorporated in the analysis, for example toothpaste is normally found in a bathroom, perhaps on a counter or sink.

As used herein the term "context" means the set of circumstances or facts relating to a particular image.

In alternative embodiment of the invention, rather than scanning for distinctive images, the system may be scanning for the environment, and identifying places in the data to which a product may be added. For example, if the system determines a kitchen counter is present, a food product can be added. Likewise, if a bathroom counter is determined to be present, a tube of toothpaste can be added without interrupting the continuity of the video.

The system also determines the variances in the distinctive image (step 235) while determining the boundaries. For examples, these variances may include lighting elements, positioning (for example the angle at which a product is displayed, and blocking elements (e.g. fingers around a portion of a can).

Figure 4:
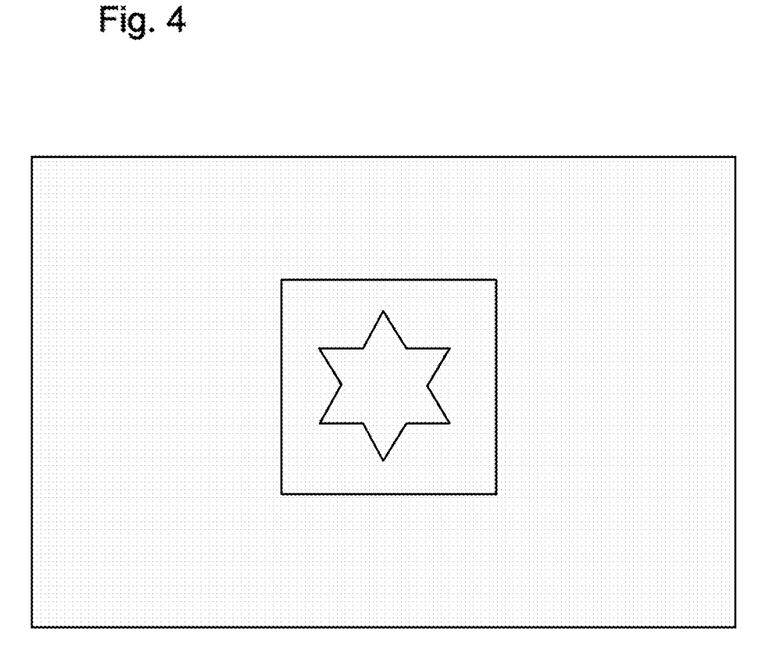
FIG. 4 is a view thereof, after a substitution has been made of the box.

The system may then select a substitution (or an addition) to the digital video file based on predetermined criteria (e.g. all X trade-marks are to be replaced by Y trade-marks) (step 240). The context variables, such as size, packaging, lighting, positioning, blocking and other elements of the context of the trade-mark to be replaced are applied to the substitute image. In the example shown in FIG. 4, the product bearing the first trade-mark as seen in FIG. 3, has been replaced with a second star shaped trade-mark.

For the digital video file data representing time following, and optionally, time preceding, the substitution is made, until the original distinctive image is no longer present in the file. The system must make allowances for movement of the trade-mark in the frame (either as background relative to the camera, or because the product is being moved) and for temporary blockages of the product (e.g. an actor moving in front of the trade-mark and temporarily removing it from a series of frames).

In an alternative embodiment of the invention, the system could scan the digital video file for the presence of a UPC code, rather than a trade-mark. The process is quite similar, although as the UPC code identifies an entire product, rather than a trade-mark, once the UPC code is located, the context of the product must be examined. In such an embodiment, once a UPC code is determined, either as a pattern of numbers or as a series of bars, the associated product can be quickly established. Note the UPC code may be associated with a trade-mark, as in many cases, a product in a video frame may show the trade-mark, but may not show the UPC code.

The alteration may be made prior to the video being displayed, so that the video file received by the user, may be the altered video file.

Use of Alteration

There are many reasons why a party may wish to use the system and method described above. For example a trade-mark owner may wish to substitute a more current trade-mark for an older trade-mark. Likewise, substitutions made on the geographical availability of a product may make it desirable to change trade-marks. A particular market strategy, for example the promotion of a particular brand, may also make it desirable to change trade-marks.

Alternatively, the copyright holder of the video may want to substitute trade-marks based on which trade-mark owner provides the holder with compensation. In the same vein, trade-mark holders may pay ISPs or other routers of the video to have their trade-mark or associated product substituted for a competitor's trade-mark or product.

Also, once a distinctive image has been identified, it can be altered in other ways, rather than the substitution of a trade-mark. For example, a trade-mark can simply be removed, and substituted with the background colour of the associated product (this is particularly useful if the trade-mark holder is no longer compensating the video maker). Alternatively, something can be added to the video relative to the distinctive image, e.g. a new design element can be added adjacent to the trade-mark. Alternatively, a complimentary product may be placed adjacent to a trade-mark (e.g. dental floss placed adjacent to toothpaste).

Another use of altering images is change sizes of products. For example a six pack of a brand of cola could be substituted for a single can, if the can is resting on a kitchen counter. Likewise, a six pack could be replaced by a case of 12 cans, or a billboard advertisement could be replaced with a different advertisement.

Another example of use of the alterations is to place vehicles along an empty road side. A video may show an empty curb into which a vehicle could be place. A billboard may be added to a digital video file, as could a television screen showing an advertisement.

Once a distinctive image is identified, it can also be changed, for example made brighter, bigger, or otherwise enhanced, or made less conspicuous, e.g. duller or smaller. This can be accomplished by changing certain pixel values for the pixels associated with the distinctive image.

Besides using the geography of the viewer to make alterations in the video, the actual geography of the video could be changed. For example, license plates of cars in the video could be altered to fit the state or province of the viewer. Flags could be changed to reflect the nationality of the viewer.

The demographics of the user may also play a role. Alterations featuring products for older consumers may be targeted to same. Likewise, toys, or other products for children may be appropriate additions to a children's room in a digital video.

The alterations can also effect the equipment appearing in the video. For example, a particular cellular phone could be substituted for another, or placed into appropriate surroundings such as a bedroom or office.

The distinctive images located can also be used to determine context. For example, a trade-mark may be used to identify a product in a kitchen (e.g. a dishwasher). If room is available, another product can be placed near the located product (for example a water cooler).

An example in an outdoors based digital video may the use of streets. If a street and city can be identified, the confidence level of the distinctive images found can be vastly improved. For example, if it is known that on $1^{st}$ Avenue of a particular city, there is a certain restaurant, if the system locates a street sign $1^{st}$ Ave, and an image that may be the name of the restaurant, the confidence that the restaurant is name is present can be greatly increased. Likewise, once a street is located, it may be possible to add vehicles, store fronts, billboards and other images.

The context can also be used to identify the location of the viewer. For example, if the viewer is receiving the video on a cellular phone or PDA, their location can be determined. This in turn, can be used to decide how best to alter the image.

Use of Database

Information may be gathered during the alteration process and stored in a database associated with record 600. For example, record 600 may include distinctive images located within video file 500. This can allow, as discussed previously, for easier location of certain distinctive images within the video (a distinctive image within the video can even be associated with certain start and end times, or with a shading or coloring modifier). Other information such as the location of the digital video, or a record of the alterations made in for the video (for example a record of trade-marks inserted into the video) may also be associated with the video.

The records could also contain information about the viewer or viewers of the video. For example, if the video is widely available via the Internet, the record could contain an aggregate or summary of information about the viewers, such as location, age, and other demographic information.

This information about the viewer and about alterations to be made may be used to send incentives to the viewer. For example, before or after the video a link to a coupon for a product appearing in the video may be presented.

The record may obtain information from server 200 or computer 100 and store such information in record 600. Particularly valuable information to advertisers may be the location the video file 500 is being downloaded to. For example, using a smart phone with a GPS system, server 400 could determine that the user is in a grocery store. If the user is in such an environment, certain alterations to video file 500 become more valuable, for example the substitution of images for products sold in that store. Likewise, if the user is on a street, substitutions for storefronts on that street are more attractive to advertisers than would more distant locations.

The time a digital video file 500 is accessed may also be an important consideration. For example, a late night download indicates certain viewing preferences of the user, whereas a daytime download may indicate a work based user.

Video files may also be flagged for manual review. For example if the confidence level of a distinctive image is above a certain threshold, but below another threshold, the video provider may prefer that the video file be viewed prior to being transmitted to a user.

The identification of distinctive images in a video file can be used to determine context. For example, if multiple kitchen appliances are located (for example a fridge and a dishwasher), the likelihood of the images being set in a kitchen is increased. Likewise, if a number of automobiles are located, as well as store names and a street name, the context of the frame is more likely to be a street. Therefore, as a number of distinctive images are located, it becomes easier to determine the context of such images.

Using the distinctive images located in a frame, a probability can be assigned to a context, for example that the setting of the frame is a street or a kitchen. If the probability is above a predetermined threshold, then the context can be associated with the frame, and if the probability is below a certain threshold, the video file can be flagged as such at that frame, until confirmed by a user or administrator.

The database may have access to a library of images. These images can include products, such as automobiles, which may be rendered in three dimensions. The images can also include contextual elements, for example the layout of a hotel room. In this example, once a hotel is identified by its trade-mark or by text within a frame, a map of standardized hotel rooms for that particular hotel can be accessed and used to provide context. A factory floor can be identified and used in a similar context.

The lack of certain distinctive images can also be used to assist in determining the context of a frame. For example, if the trade-mark of a hotel is located, the setting f the frame, if indoors is likely to be within the hotel. However, if a number of bottles of alcohol are present, and no bed is present, it becomes more likely the frame is set in a bar rather than a hotel room. If a bathroom is present however, the probability that the setting is a hotel room increases.

Also, the system may have access to purchase behavior information based on the computer 100's past purchases. This information can be used to determine appropriate advertising for that computer, and therefore assist it making an appropriate alteration.

Figure 6:
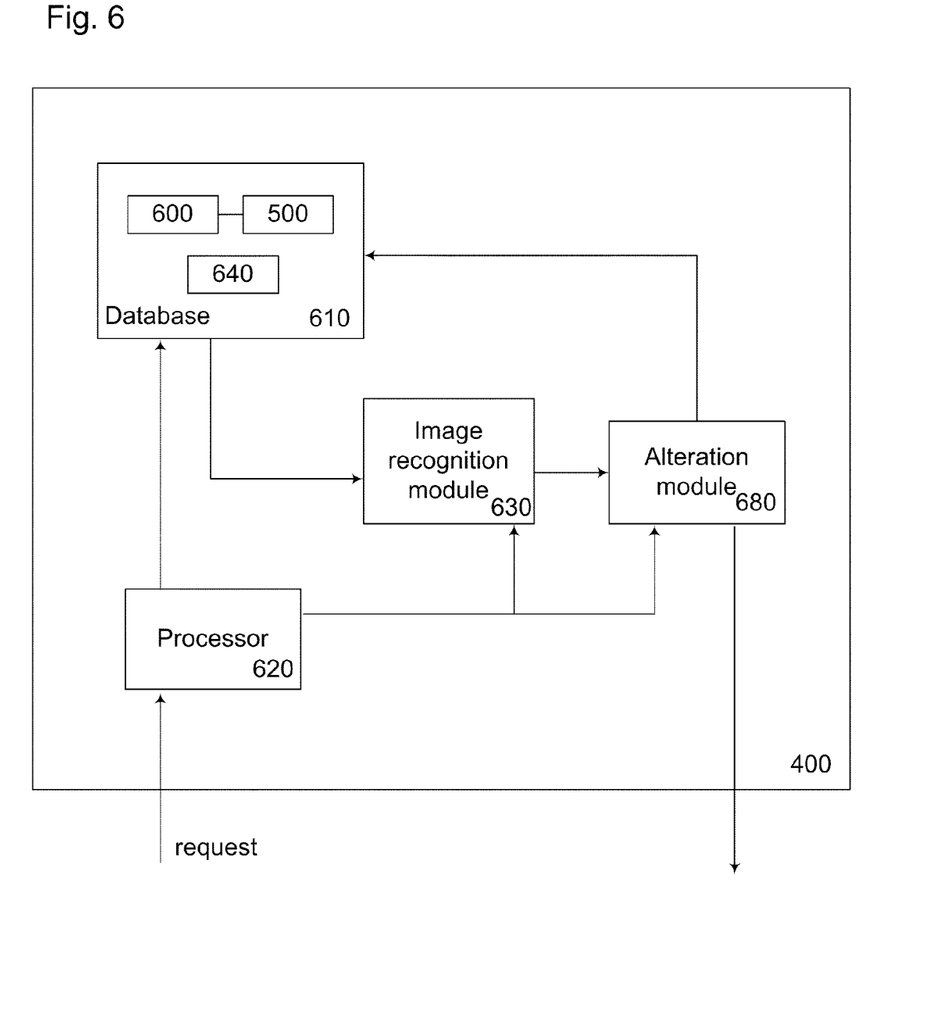
FIG. 6 is a block diagram of software embodying a method of a carrying out the invention.

As shown in FIG. 6, the process by which distinctive images are located and altered in digital video file 500 can be done in a computer, such as server 400. A request for digital video file 500 reaches processor 620 in server 400, and database 600 is accessed to obtain record 600 associated with digital video file 500.

The method of altering distinctive images in server 400 can be carried out by a series of modules, which may be implemented in hardware or software. Image recognition module 630, accesses database 600 to obtain image data according to rule set 640. Rule set 640 provides instructions to image recognition module 630 based on information about digital video file 500 and other relevant information such as information about the requestor, and the time of day and address. The instructions from rule set 640 include information about which distinctive images to search for.

Image recognition module 630 then scans digital video file 500 for such images and reports to alteration module 650 regarding the success of such scan and where the distinctive images, if located are placed in digital video file 500.

Alteration module 650 provides information to rule set 640 regarding the distinctive image found, and based on instructions from rule set 640 alters digital video file 500 accordingly. Several alterations to digital video file 500 may be made, depending on the distinctive image located, and the number of distinctive images located. After being altered, the altered digital video file 500 is sent to the requestor, and it may also be saved in database 610.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

The present methods, systems and articles also may be implemented as a computer program product that comprises a computer program mechanism embedded in a computer readable storage medium. For instance, the computer program product could contain program modules. These program modules may be stored on CD-ROM, DVD, magnetic disk storage product, flash media or any other computer readable data or program storage product. The software modules in the computer program product may also be distributed electronically, via the Internet or otherwise, by transmission of a data signal (in which the software modules are embedded) such as embodied in a carrier wave.

For instance, the foregoing detailed description has set forth various embodiments of the devices and/or processes via the use of examples. Insofar as such examples contain one or more functions and/or operations, it will be understood by those skilled in the art that each function and/or operation within such examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, flash drives and computer memory; and transmission type media such as digital and analog communication links using TDM or IP based communication links (e.g., packet links).

Further, in the methods taught herein, the various acts may be performed in a different order than that illustrated and described. Additionally, the methods can omit some acts, and/or employ additional acts.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

While certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

I claim:

1. A method of altering a distinctive image within a digital video file, comprising:
 a) selecting data representing a set of images within the digital video file;
 b) scanning said data for a first pixel having a color associated with the distinctive image;
 c) searching for additional pixels having said color in a plurality of directions relative to said first pixel;
 d) determining a shape associated with said additional pixels of said color;
 e) determining if a plurality of pixels in a relative position to said shape has a color conforming to the distinctive image;
 f) calculating a probability that said image is present in said data;
 g) if said probability exceeds a confidence level, altering said distinctive image;
 h) repeating steps a) through g) on following data representing subsequent images until said calculated probability does not exceed said confidence level; and
 i) determining a context that specifies a location depicted in the images of the digital video file based at least in part on the distinctive image; and
 j) altering the distinctive image with a second distinctive image throughout the digital video file.

2. The method of claim 1 wherein the distinctive image is a trade-mark.

3. The method of claim 2 wherein the method further comprises:
 determining an image of a product associated with said trade-mark.

4. The method of claim 3 wherein said image of said product is altered.

5. The method of claim 4 wherein said image of said product is altered by substitution for a second image of a second product.

6. The method of claim 4 wherein said image of said product is altered by addition of data representing an image of a related product to said data representing a frame.

7. The method of claim 4 wherein said image is altered by removal of said image of said product from said data.

8. The method of claim 1 wherein said steps are carried out by one of:
   a) a computer displaying the digital video file;
   b) a server storing said digital video file; or
   c) a computer receiving said digital video file from a server and transmitting said digital video file to a second computer.

9. The method of claim 1 wherein said second image is substituted based on the geographical location of said computer requesting said digital video file.

10. The method of claim 1 wherein said alteration is based on a history of purchase behavior of a user.

11. The method of claim 1 wherein when determining the probability, considering the mathematical relationship of components of the distinctive image.

12. The method of claim 1, wherein the set of images are selected at predetermined time intervals from the digital video file.

13. The method of claim 1 wherein the context includes blocking information, and the alteration of the distinctive image does not alter the blocking information.

14. A system for altering an image of a product within a digital video file, comprising:
   a) a first computer requesting the digital video file from a second computer over a network;
   b) at least one of said first or second computers configured to:
      i) select data representing a set of images within the digital video file;
      ii) scan said data for a first pixel having a color associated with an image;
      iii) search for additional pixels having said color in a plurality of directions relative to said first pixel;
      iv) determine a shape associated with said additional pixels of said color;
      v) determine if a plurality of pixels in a relative position to said shape have a color conforming to said image of a product;
      vi) calculate a probability that said image is present in said data; and
      vii) if said probability exceeds a confidence level, alter said image of a product;
      viii) repeat steps i) through vii) on data representing images selected from the group consisting of previous data representing images and subsequent data representing images, until said calculated probability does not exceed said confidence level; and
      ix) altering the image with a second image throughout the digital video file; and
      x) determining a context that specifies a location depicted in the digital video file based at least in part on the distinctive image.

* * * * *